United States Patent [19]

Sampson

[11] Patent Number: 4,815,333
[45] Date of Patent: Mar. 28, 1989

[54] INTEGRATED BICYCLE PEDAL WITH SELF CENTERING AND LATERAL RELEASE CAPABILITIES

[75] Inventor: Eric A. Sampson, Denver, Colo.
[73] Assignee: Sampson Sports, Inc., Denver, Colo.
[21] Appl. No.: 16,277
[22] Filed: Feb. 19, 1987
[51] Int. Cl.$^4$ .............................................. G05G 1/14
[52] U.S. Cl. ..................................... 74/594.6; 36/131
[58] Field of Search ...................................... 74/594.6
[56] References Cited

U.S. PATENT DOCUMENTS

| 590,685 | 9/1897 | Matthews | 74/594.6 |
| 4,640,151 | 2/1987 | Howell | 74/594.6 |
| 4,646,586 | 3/1987 | Rapisarda | 74/594.6 |
| 4,665,767 | 5/1987 | Lassche | 74/594.6 |
| 4,686,867 | 8/1987 | Bernard et al. | 74/594.6 |

FOREIGN PATENT DOCUMENTS

| 0169080 | 1/1986 | European Pat. Off. | 74/594.6 |
| 3149345 | 6/1983 | Fed. Rep. of Germany | 74/594.6 |
| 3426103 | 1/1986 | Fed. Rep. of Germany | 74/594.6 |
| 3423593 | 2/1986 | Fed. Rep. of Germany | 74/594.6 |
| 993958 | 11/1951 | France | 74/594.6 |
| 2279607 | 2/1976 | France . | |
| 2432427 | 4/1980 | France . | |
| 0146454 | 11/1984 | France . | |
| 2568213 | 1/1986 | France . | |
| 60971B80 | 10/1980 | Italy . | |

OTHER PUBLICATIONS

Bicycling—1987 Buyers' Guide, Mar. 1987—pp. 129 and 145.
Bicycling—1987 Buyers' Guide, Mar. 1987—"Pedal System Safety" by Frank Berto—pp. 146-153.

*Primary Examiner*—Gary L. Smith
*Assistant Examiner*—Rodney M. Lindsey
*Attorney, Agent, or Firm*—Dorr, Carson, Sloan & Peterson

[57] ABSTRACT

A bicycle pedal system which attaches a cyclist's shoe to a bicycle pedal. The system consists of a cleat attached to the cyclist's shoe under the ball area of the foot. The cleat has two downward projections. These projections feature arcuate tracts for matingly engaging the cleat to a pedal body. The pedal body is shaped to matingly engage the cleat and contains a tensioned mechanism centered in the back of the pedal body. If a rotating force on the cleat exceeds a predetermiend level, a release of the shoe cleat from the pedal body occurs. If such rotating forces do not exceed said predetermined level, the shock or movement will be absorbed and the shoe cleat is returned to the optimum position in the center of the pedal body.

9 Claims, 6 Drawing Sheets

INTEGRATED BICYCLE PEDAL WITH SELF CENTERING AND LATERAL RELEASE CAPABILITIES

RELATED APPLICATION

This application is related to a co-pending application by the same inventor entitled "Self Contained Braking System for Bicycle Pedals" filed May 27, 1987, Ser. No. 054,577 now pending.

FIELD OF THE INVENTION

This invention relates to bicycle pedals and, in particular, to a bicycle pedal which is adapted to matingly engage with a cleat attached to the shoe of a bicycle rider. The pedal is further adapted to disengage itself from the cleat by a twisting motion of the rider's shoe once predetermined forces have been exceeded.

BACKGROUND OF THE INVENTION

It is a problem in art to provide a bicycle pedal of high pedaling efficiency. An ideal bicycle pedal would efficiently coact with a cyclist's foot with respect to downward forces on the pedal, with respect to upward forces on the pedal as the cyclist lifts his foot, and with respect to forward and backward forces exerted on the pedal by the cyclist's foot. The ideal pedal would further be easy to get into and out of. In other words, it would be easy for the cyclist to engage his foot with the pedal as well as to controllably disengage his foot from the pedal.

Numerous bicycle pedal arrangements are known having varying degrees of pedaling efficiency. A common pedal arrangement is termed the "quill" pedal. The quill pedal is characterized by a main axle section which is attached to a bicycle crank arm and which contains approximately one inch extensions from the axle section to which parallel cage plates are attached at the front and rear of the pedal. In order to utilize the quill pedal, the cyclist simply pushes his foot against the platform formed by the parallel cage plates. However, only limited performance is obtained from the quill pedal since the cyclist can only use a pushing motion of his foot to generate pedal power.

Numerous attempts have been made to increase the performance of the quill pedal. One such modification includes the addition of a toe clip which comprises a thin metal or plastic attachment to the front cage of the pedal. The toe clip is shaped like the toe of a shoe and its function is to prevent a cyclist's shoe from slipping off the pedal during a forward pedaling motion. To enhance the performance of the quill pedal even further, the toe clip has been modified to allow a leather strap and buckle arrangement to go around or through both the pedal and the toe clip to encircle the cyclist's foot on the top of the pedal. The main advantage provided by the toe clip and strap is that it not only enables the cyclist to generate power by pushing his foot forward against the pedal platform, but it also allows an upward force to be exerted by his foot. This increases the cyclist's pedaling efficiency.

In order to improve further upon the pedaling efficiency of the quill pedal, a modification called a "cleat" has been developed. This cleat comprises a small metal or plastic attachment to the cyclist's shoe. The cleat is slotted and is adapted to matingly engage a quill section of the bicycle pedal. The use of the slotted cleat enhances a cyclist's ability over that provided by toe clips and straps since it permits a greater pedaling efficiency to be obtained.

Although the provision of the above mentioned toe clips, straps, and cleats greatly improves a cyclist's pedaling efficiency, it does so at the cost of numerous disadvantages. To be used efficiently, the toe strap must be tightened to such a degree that the removal of the foot is often difficult, if not impossible. Further, the length of the toe strap can be increased only by the cyclist reaching down and adjusting the buckle of the strap. In many situations, such as a sudden stop, the cyclist does not have sufficient time to loosen the strap, remove his foot and place it on the ground. Quite often, the result is that the cyclist falls since he cannot quickly disengage his foot from the strap and the pedal. If the cyclist happens to be using a cleat which fits over the rear quill of the pedal, this further compounds the problem since the rider must not only loosen the strap, but he must also disengage the cleat from the rear cage portion of the pedal.

Problems also exist when the cyclist attempts to insert his foot into the above described pedal arrangements. The cage plates of the quill pedal typically rotate on an axle which is affixed to the crank arm of a bicycle. This being the case, the natural resting position of the pedal, due to gravity, is approximately 180 degrees (upside down) from the position in which the pedal is used when engaged with the cyclist's foot. This upside down position of the pedal, at rest, is due to the weighting of the pedal by the provided toe clips and straps. Thus, in order to insert a shoe into the pedal arrangements, including toe straps and clips, the rider must first manually rotate the pedal right side up, insert his foot into the pedal, and engage the cleat if one is being used. He must then bend over and tighten the strap to obtain an efficient use of the pedal system.

Recent attempts have been made to alter the design of the conventional pedal arrangement above described by making their shape more aerodynamic or lighter. However, for the most part, the dual arrangements have retained a platform for the shoe to rest on, a toe clip, a strap, and a rear cage for a cleat engagement. As a result, recent attempts have not solved the above discussed problems.

One such attempt comprises a pedal system manufactured by Look. This Look system is shown on pages 129 and 145 of the 1987 Buyer's Guide Edition of the publication BICYCLING dated March, 1987 and published by Rodale Press Inc. The Look system is also shown in U.S. Pat. No. 4,686,867 to Bernard et al of 8-18-87. The Look system comprises a somewhat triangular shaped pedal body which revolves about a pedal axis. The top of the Look pedal is recessed at both its front and rear portions. There are protrusions at both the front and rear of the recess in order to hold a shoe cleat. The rear portion of the pedal, which portion also comprises the rear part of the recess, is hinged and tensioned in order to allow this rear portion to rotate backwardly in an arcing manner in order to open it. A triangular cleat-like attachment is connected to the cyclist's shoe and is designed to be inserted into the recess of the pedal body. The cyclist interlocks the shoe cleat with the pedal body by pushing a front portion of the cleat into the front recess of the body and by then pushing down with his heel. This pushing down of the heel opens a back cage comprising the rear recess and allows the rear of the cleat to interlock with the rear recess. The cleat is disengaged from the pedal body by a rotating or twisting motion of cyclist's shoe.

Further attempts have been made to provide improved pedal arrangements. However, all of these attempts have not been successful in achieving the ideal pedal system and they suffer from one or more of the above discussed problems. It can therefore be seen that the presently available bicycle pedal systems do not provide the performance of an ideal pedal system.

SUMMARY OF THE INVENTION

The present invention solves the above discussed problems and achieves a technical advance in the art by providing a bicycle pedal system having the characteristics of the idealized bicycle pedal system above characterized. More specifically, the present invention comprises an improved bicycle pedal system that cooperates with a cyclist's shoe without the use of toe clips or straps and, at the same time, provides performance benefits not heretofore achievable. The pedal system of the present invention provides high pedaling efficiency for all forces that may be generated by a cyclist's foot. This includes downward forces, upward forces, as well as forward and backward forces. The pedal system of the present invention further provides easy engagement of the cyclist's foot with the pedal. It further provides for easy removal of the cyclist's shoe from the pedal.

The present invention comprises two separate parts. The first part comprises a cleat element which attaches to the ball area of a cyclist's shoe. The second part comprises a pedal body that is attached to and rotates about an axle connected to the bicycle's crank arm. The pedal body is adapted to matingly engage with the cleat element on the cyclist's shoe. In a first embodiment of the present invention, the pedal body has of a forward extension of the top front portion of the pedal body. This extension is of the same longitudinal radius along its leading edge as is the longitudinal radius of the rear surface of the pedal body. This extension has a vertical radius on its forward extremity that is different from that of its longitudinal radius. The front portion of the shoe cleat is designed to accept the front extension portion of the pedal body. This front portion of the shoe cleat consists of a grooved inner channel having an inner longitudinal radius along its width with this radius being the same as the longitudinal radius of the front extension of the pedal body. An advantage provided by this embodiment of the invention is that in addition to allowing the front extension of the pedal body to easily engage the forward portion of the shoe cleat, it provides a solid non-moving platform for the cyclist's foot to pull against. It also affords a natural and easy path when the cleat is to be disengaged from the main pedal body.

The heel or rear portion of the pedal body has an enclosed depressible tensioned spring loaded detent mechanism which protrudes from a rear vertical surface of the pedal body. This detent mechanism is basically triangular in shape when viewed from the side. The rear vertical surface of the pedal body has a longitudinal radius along its width and trailing edge with this radius matching the rear longitudinal radius of a rear portion of the cyclist's shoe cleat. This depressible detent mechanism is designed to matingly engage with rear portion of the cleat, and in particular, is designed to engage an inner shelf on the rear portion of the cyclist's shoe cleat.

The heel or rear portion of the cleat provides an advantage that is an important part of the invention. This rear portion extends in a downward manner from the sole of the cyclist's shoe to a depth that is similar to that of the pedal body. This rear portion of the cleat also contains an inner channel having a longitudinal radius that is of the same radius as the longitudinal radius of the rear vertical surface of the pedal body. The channel has a seating cavity having a depth which is greater in its center and which decreases symmetrically as each side of the cleat is approached. As a result of the design of this channel, the pedal system provided by the invention has the ability to re-center itself in its optimum position after encountering torsional shocks or other motions which do not exceed the predetermined level at which the pedal and cleat disengage from one another.

During the use of the provided pedal arrangement, the rider simply places the front of his shoe over the pedal body and engages the front of the attached cleat with the front extension of the pedal body. The rider then applies a downward pressure with the rear of his foot. This allows the rear portion of the shoe cleat to depress the triangular shaped detent mechanism in the pedal body and to matingly engage the rear part of the pedal body with the rear of the cleat. Once the pedal body is engaged fully with the shoe cleat, a lower horizontal surface of the triangular detent mechanism is at rest against an inner shelf on the bottom rear area of the cleat. The detent mechanism cannot be compressed from this position by upward forces. It therefore becomes virtually impossible to disengage the pedal from the cleat by using any type of a pulling motion of the cyclist's foot. This is a most desirable feature.

To release the shoe from the pedal body, the rider simply twists his foot with sufficient force to exceed a predetermined level of force. By twisting his foot, the channel walls in the rear portion of the cleat engages and depresses the sides of the triangular shaped detent mechanism. When this force exceeds a predetermined amount, the detent mechanism is fully depressed and this allows the cleat to rotate away from the pedal body. Should the lateral force be less than that required to release the shoe cleat, the cleat automatically returns itself to its center position on the pedal body due to the longitudinal radius of the channel contained in the rear portion of the cleat.

The pedal body of the invention has symmetrical longitudinal radii along both its front and rear extremities. The similar radii facilitate the disengagement of the cleat from the pedal body when sufficient torsional forces are generated. Under such conditions, the concave portion of the rear portion of the cleat depresses the tensioned release detent. The detent mechanism depresses and allows the front and rear extensions of the cleat to rotate along the symmetrical longitudinal radii of the pedal body. When these lateral forces equal or exceed a predetermined level, a rotation of the cyclist's shoe and cleat disengages the cleat from the pedal body. Should the lateral forces be removed before the predetermined level of the force is generated, the front and rear portions of the cleat return rapidly to the longitudinal center of the pedal body so that the pedal body and the cleat remain engaged.

It may therefore be seen that the pedal system of the invention solves the problems of prior arrangements and provides an advance in the art.

OBJECT OF THE INVENTION

It is an object of this invention to provide an improved bicycle pedal system for affixing a cyclist's shoe to a bicycle pedal.

It is another object to provide a novel bicycle pedal system which is releasable from a cyclist's shoe with the use of only a torsional motion of the cyclist's foot.

It is another object to provide a novel pedal system which has the capability not only to absorb torsional motion caused by momentary forces, but to return the shoe cleat to its optimum position after the absorption of such forces.

It is another object to provide an improved bicycle pedal which utilizes symmetrical radii on its front and rear portions for matingly engaging a second symmetrical radius along front rear portions of a cooperating cleat attached to a cyclist's shoe.

BRIEF DESCRIPTION OF THE DRAWING

These and other objects and advantages of the invention may be better understood from a reading of the following description thereof taken in conjunction with the drawing in which.

DETAILED DESCRIPTION

Figure 1:
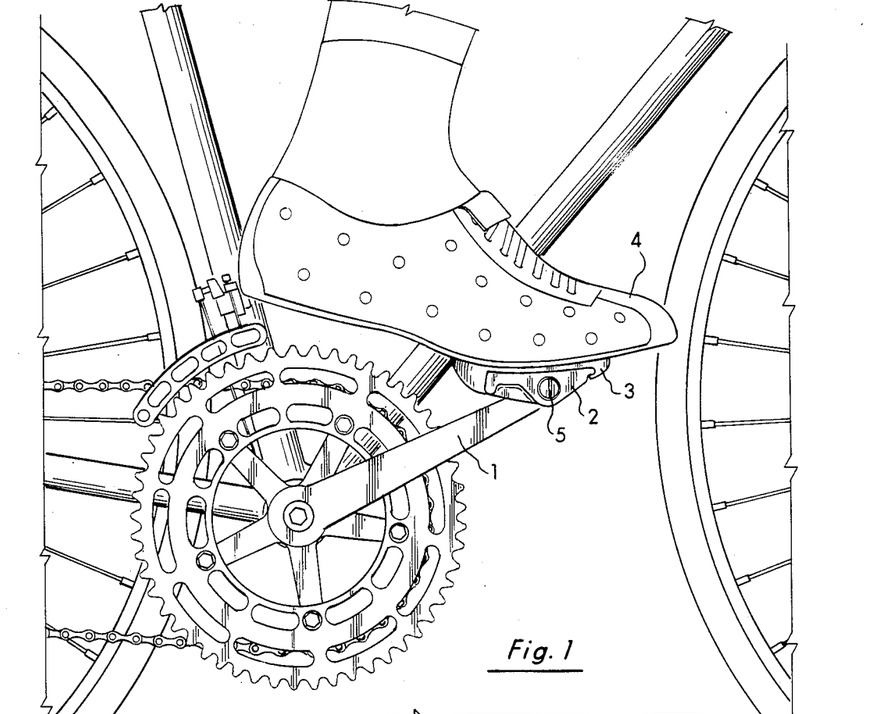
FIG. 1 is a first view of a bicycle utilizing one possible embodiment of the pedal system of the present invention.

FIG. 1 shows one possible exemplary embodiment of the bicycle pedal system of the present invention as comprising a cleat 3 and a pedal body 2. Cleat 3 is attached to a shoe 4 of a cyclist. Pedal body 2 is attached by a shaft 5 to a bicycle crank arm 1. With the cyclist's shoe 4 being attached to cleat 3, and with cleat 3 being matingly engaged with pedal body 2, the cyclist's foot may exert pedaling forces against axle 5 and crank 1 in a downward manner, in an upward manner, as well as in a forward and backwards manner.

Figure 2:
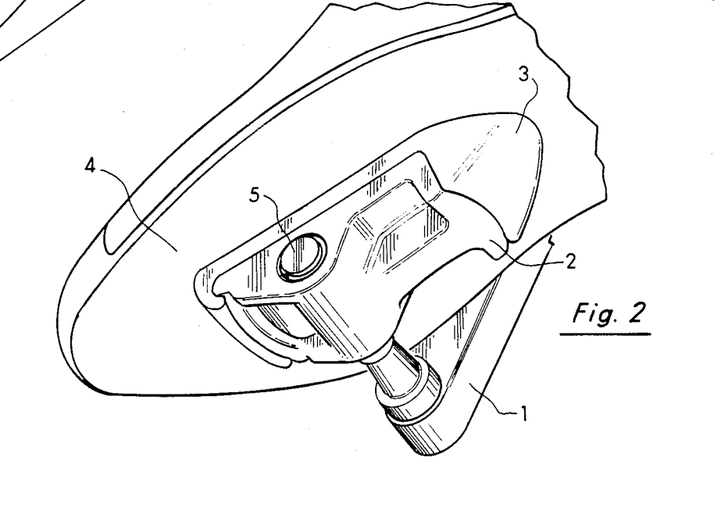
FIG. 2 is a bottom isometric view of the pedal system.

FIG. 2 shows a bottom view of the cyclist's shoe 4 and the manner in which it cooperates with cleat 3, pedal body 2, and axle 5. The pedal body 2 is retained on axle 5 by means of a suitable retaining mechanism such as a C-spring clip (not shown). The inner end of axle 5 is attached to crank arm 1 by any suitable means such as, for example, by means of male threads on the inner end of axle 5 and cooperating mating female threads in a hole in an outer portion of crank arm 1.

Figure 3:
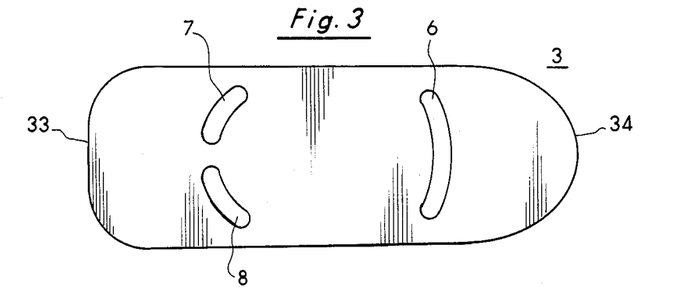
FIG. 3 is a top view of the cyclist's shoe cleat.
Figure 16:
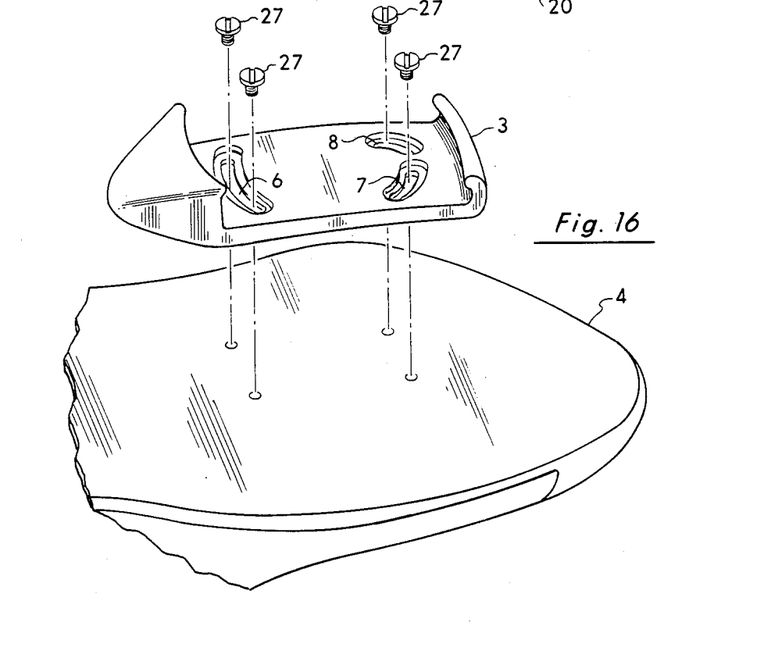
FIG. 16 shows how the cleat is attached to a cyclist's shoe.

FIG. 3 is a top view of the cleat 3. This is the portion of the cleat that attaches to the cyclist's shoe. Cleat 3 contains slots 6, 7, and 8 which are adapted to receive screws for attaching the cleat to a shoe. The manner in which this attachment is achieved is shown in FIG. 16.

Figure 4:
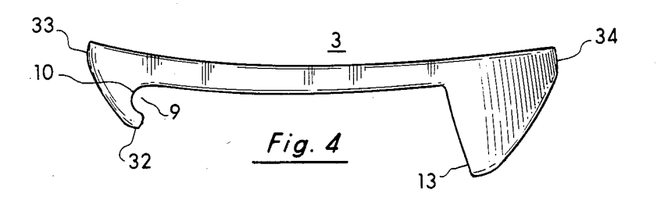
FIG. 4 is a side view of the cyclist's shoe cleat.

FIG. 4 is a side view of the cleat of FIG. 3. The left side (the front) of the cleat of FIG. 4 comprises an inner channel 9 having a curved vertical radius 10. The right (the rear) of the cleat on FIG. 4 comprises a lip or inner shelf 13 which is shown in greater detail on FIG. 9.

Figure 5:
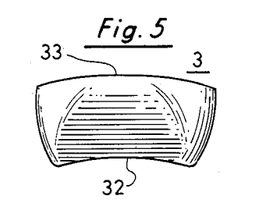
FIG. 5 is a front end view of the cleat.
Figure 6:
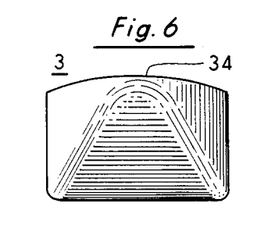
FIG. 6 is a rear end view of the cleat.
Figures 7, 8, 9:
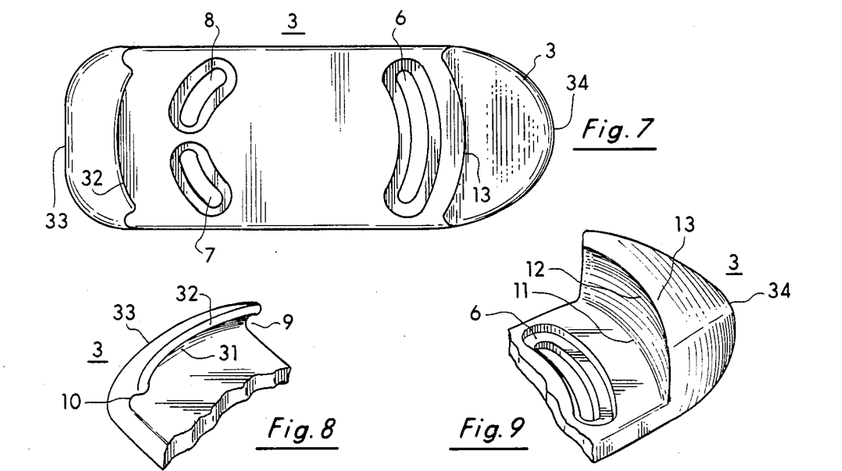
FIG. 7 is a bottom view of the cleat.
FIG. 8 discloses a segment of the front end of the cleat.
FIG. 9 discloses a segment of a rear section of the cleat.

FIG. 5 is a front end view of cleat 3 of FIG. 4. FIG. 6 is a rear end view of cleat 3 of FIG. 4. FIG. 7 is a view of the bottom of cleat 3. Shown on FIG. 7 are the slots 6, 7, and 8 which receive the screws that are used to attach the cleat to a cyclist's shoe.

FIG. 8 is an isometric segmented view of the front of cleat 3. Shown in further detail in FIG. 8 are the inner channel 9 having the vertical radius 10 and having an inner longitudinal radius 31. With the configuration shown in FIG. 8, it can be seen that portion 33 is the front extremity of the cleat and that portion 32 is the bottom most extremity of the cleat as shown on FIG. 4. It can also be seen that the outside surface portion of the front of the cleat between segments 32 and 33 is curved and extends downwardly on FIG. 4 from the element 33 portion to the element 32 portion. In summary, the front of the cleat contains an inner portion, as shown on FIGS. 8 and 4, having an inner curved channel 9 having a vertical radius 10 and a longitudinal radius 31.

FIG. 9 is an isometric view of a segment of the rear end of the cleat 3. The rear segment of the cleat on FIG. 9 has an inner recess or channel 12 having a bottom longitudinal radius 11. Segment 34 comprises the rear most extremity of the cleat. Element 13 comprises the top portion of a ridge or shelf whose lower portion on FIG. 4 comprises a portion of channel 12. The details of channel 12 and shelf 13 are better shown on FIGS. 20 and 21.

Figures 17, 18, 19:
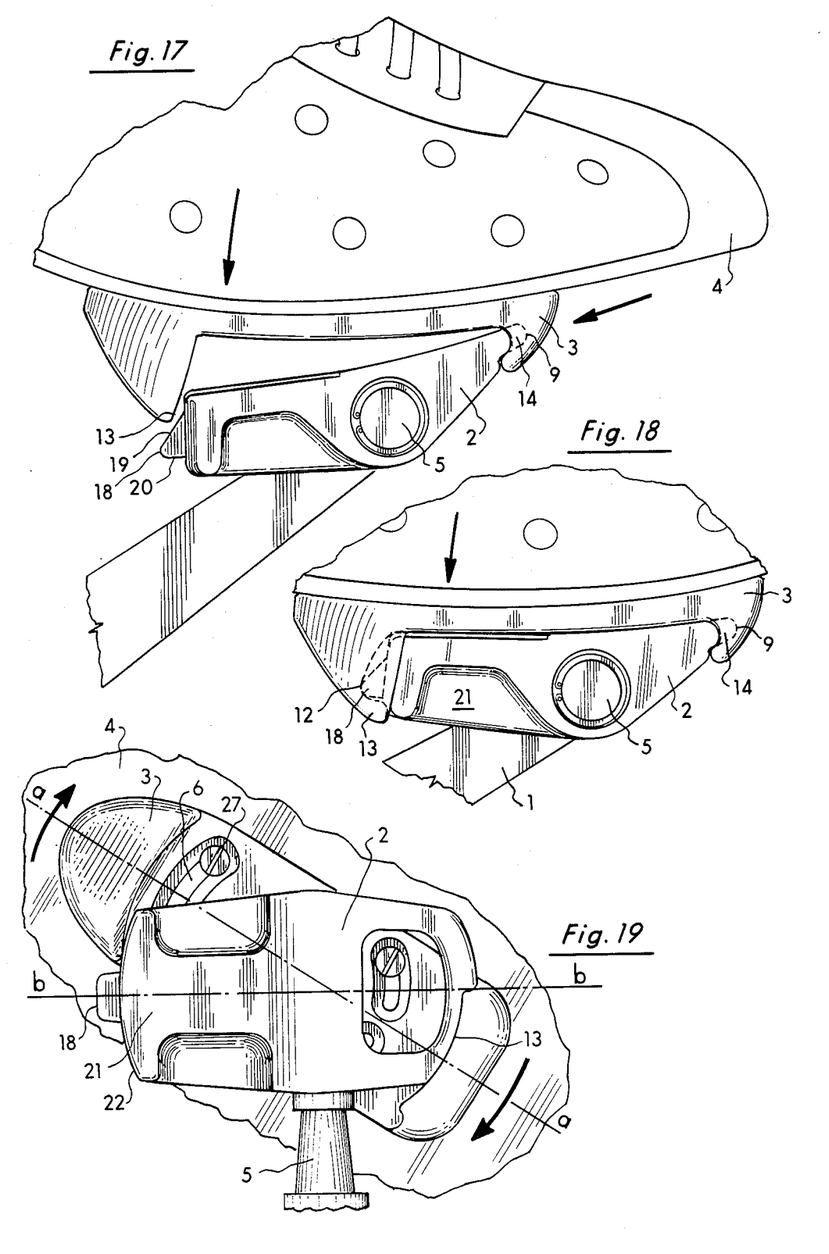
FIG. 17 is a side view showing the state of the shoe cleat and the pedal body as the cyclist begins to engage the cleat with the pedal body.
FIG. 18 is a side view showing the cleat and the pedal body fully engaged.
FIG. 19 is a bottom view showing the state of the shoe cleat and the pedal body as the cyclist twists his shoe to disengage his foot from the bicycle pedal.
Figure 20:
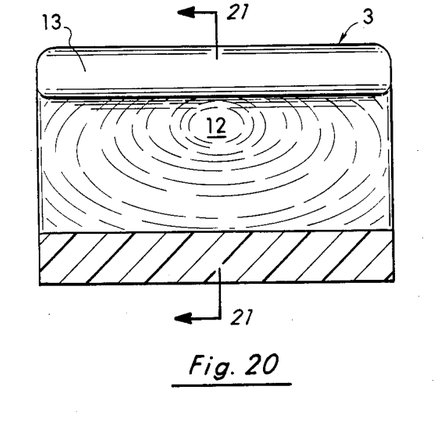
FIG. 20 is an inner end view of the rear cleat segment of FIG. 9.
Figure 21:
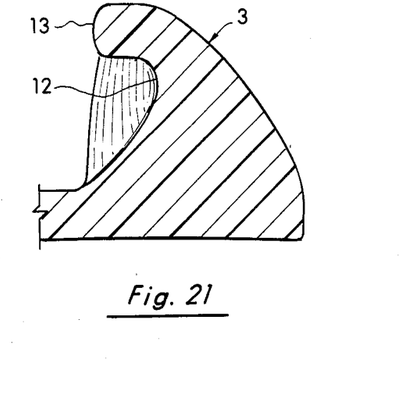
FIG. 21 is a cross sectional view taken along lines 21—21 of FIG. 20.

FIG. 20 discloses a front end view of channel 12 in the rear portion of the cleat segment of FIG. 9. FIG. 21 comprises a sectional side view of channel 12 taken along axis 21—21 of FIG. 20. Channel 12 may be best appreciated from a study of FIGS. 9, 20, and 21 taken together. As may be seen, the channel 12 has a seating cavity and is the deepest in the middle of the cleat and becomes increasingly shallow as the side of the cleat is approached. Channel 12 receives a detent mechanism 18 on the pedal body 2 when the pedal body and the cleat are fully engaged. At this time, the detent mechanism is fully extended and coacts with the deepest portion of channel 12 in the middle of the cleat. The detent mechanism becomes increasingly compressed inwardly against spring 23 as the cleat rotates as shown in FIG. 19, due to the fact that the detent mechanism 18 encounters the increasingly shallow portions of channel 12 as the rotation of the cleat with respect to the pedal body increases. The detent mechanism clears channel 12 when the cleat is rotated to the point where the detent mechanism 18 clears the side of the cleat and channel 12. Element 18 is then no longer compressed by the walls of channel 12 and the rear portion of cleat 3.

The details of the pedal body are shown on FIGS. 10, 11, 12, 13, 14, and 15.

Figure 10:
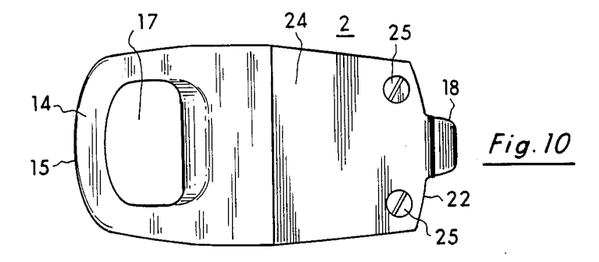
FIG. 10 is a top view of the pedal body.

FIG. 10 illustrates the top of the pedal body 2 which has a front extension portion 14 having a longitudinal radius 15 and a void 17. The rear portion of the pedal body 2 includes a metal plate 24, screws 25, and a detent mechanism 18.

Figure 11:
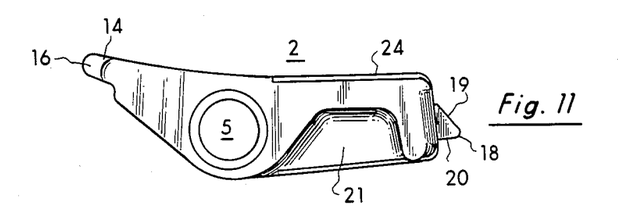
FIG. 11 is a side view of the pedal body.

FIG. 11 is a side view of the pedal body 2 of FIG. 10. On the left side of FIG. 11 it is shown that the forward extension portion 14 has a vertical radius 16. On the right side of FIG. 11 is shown a spring housing portion 21 of pedal body 2. Also shown on the right side of FIG. 11 is a sloping portion 19 and a bottom horizontal surface 20 of detent mechanism 18.

Figure 12:
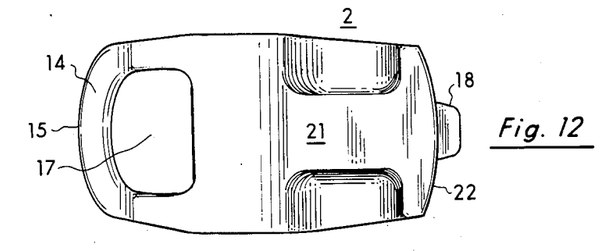
FIG. 12 is a bottom view of the pedal body.

FIG. 12 is a bottom view of the pedal body. Shown on the left side of FIG. 12 is the longitudinal radius 15 of forward extension 14. Shown on the right side is the longitudinal radius 22 of the rear extremity of pedal body 2. The radii 22 and 15 are equal in order to facilitate the release of cleat 3 from pedal body 2 as the cyclist exerts a twisting torque on the shoe to which the cleat is attached.

Figure 13:
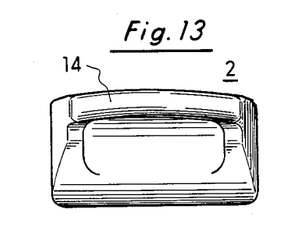
FIG. 13 is a front end view of the pedal body.
Figure 14:
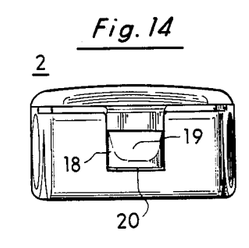
FIG. 14 is a rear end view of the pedal body.

FIG. 13 is a front end view of the pedal body having segment 14 which comprises the forward most extension of pedal body 2. FIG. 14 is a rear end view of pedal body 2 with detent mechanism 18 being shown together with its upper sloping surface 19 and its lower horizontal surface 20.

Figure 15:
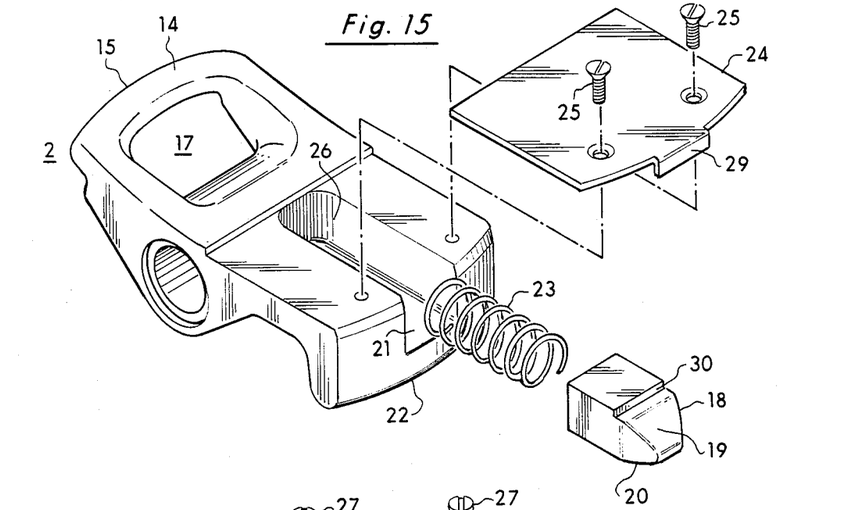
FIG. 15 is an exploded isometric view of the parts comprising the pedal body.

FIG. 15 illustrates further details of the pedal body including the elements within the spring housing 21. Specifically shown on FIG. 15 are the void 17, the forward extension 14 of pedal body 2 together with its longitudinal radius 15. On the rear portion of the pedal body is a spring 23 adapted to be contained within spring housing 21. Also shown is plate 24 for the top portion of the rear half of the pedal body 2. Plate 24 is affixed to the pedal body 2 by means of screws 25. The plate 24 has a downward retainer lip or portion 29 which is adapted to bear against vertical face 30 of the detent mechanism 18 when spring 23 and detent mechanism 18 are enclosed within the spring housing 21 and when plate 24 is affixed to the pedal body. The portion of detent mechanism 18 that is restrained and contained within the spring housing 21 is the portion of element 18 that is to the left of vertical face 30. At this time, vertical face 30 bears against the vertical lip 29 of plate 24. At such times, the only portion of detent mechanism 18 that protrudes out of the pedal body is that to the right of vertical face 30. This is the portion that comprises sloping face 19 and bottom surface 20.

It may be seen from a study of FIGS. 4 through 10, which illustrates details of the cleat, and from a study of FIGS. 10 through 15, which illustrate details of pedal body 2, that a cyclist engages his shoe cleat 3 with pedal body 2 by tilting his foot slightly downward so that the channel 9 in the front of cleat 3 engages the forward extension 14 of pedal body 2. At this time, the forward extension 14 is within channel 9 of cleat 3. The vertical radius 16 of the front of pedal body 2 is equal to the vertical radius 10 of channel 9. The horizontal longitudinal radius 15 of pedal body 2 is equal to the horizontal longitudinal radius 31 of channel 9. Thus the forward extension 14 of the pedal body at this time matingly engages with channel 9 on the forward portion of cleat 3. Having interlocked the front of cleat with the front of the pedal body in this manner, the cyclist next moves his heel down so that the ridge portion 13 of cleat bears against the sloped portion 19 of detent mechanism 18. This downward force causes detent mechanism 18 to compress inward until it is flush with the rear most surface 22 of the pedal body. The cyclist then continues to push the heel portion of his cleat down. When the heel portion is depressed sufficiently so that the horizontal bottom portion 20 of detent mechanism 18 clears the top portion of shelf or ridge 13, detent mechanism 18 then snaps to the right on FIG. 15 and enters the rear cleat channel 12 and its cavity of FIG. 9.

Once the detent mechanism snaps to the right as shown on FIG. 11 and enters the rear cleat channel 12 of FIG. 9, the cleat and the pedal body are firmly interlocked with each other. At this time, the cyclist may exert forces in any direction to pedal the bicycle. These forces may be in a downward direction, in an upward direction, or forward or backwards. Regardless of the direction of the force, the cleat and the pedal body remain interlocked and idealized pedaling efficiency is achieved in so far as concerns the interlocking relationship between the cleat attached to the cyclist's shoe and the pedal body.

The cyclist may controllably disengage his foot and cleat 3 from pedal body 2 by exerting a twisting force on his shoe and cleat 3. At such times, cleat 3 is free to rotate with respect to pedal body 2 since the longitudinal radii 15 and 22 of the pedal body are equal to the longitudinal radii 31 and 11 of the cleat. Since these four radii are equal, a twisting motion is easily achieved. The rear channel 12 and its cavity of the cleat is configured in such a manner that it is deeper in the middle portion of the cleat and so that it becomes increasingly shallow towards the side portions of the cleat. Thus, detent mechanism 18 is fully extended prior to the initiation of a twisting motion by the cyclist on the cleat. As the twisting motion progresses, the cleat rotates and the further it rotates, the more detent mechanism 18 encounters the increasingly shallower portions of channel 12. When the twisting motion has progressed to the point that the detent mechanism 18 encounters the portion of the channel near the side of the cleat, detent mechanism 18 is fully compressed and the cleat can then be freely turned further so that the detent mechanism 18 snaps out and becomes fully extended as it clears the side of cleat 3. Thus, it can be seen that the cyclist may controllably cause his foot and cleat 3 to release from pedal 2 at any time the cyclist desires to achieve this release.

The configuration of the inner portion of channel 12 and particularly the middle portion of channel 12 as shown on FIG. 9 is such that, in cooperation with the spring tension exerted on detent mechanism 18, cleat 3 and pedal body 2 do not disengage from one another unless a certain predetermined twisting force is exerted on cleat 3 and pedal body 2. Forces less than this predetermined amount may be encountered during the use of the bicycle. These forces may rotate cleat 3 slightly with respect to pedal body 2 and, in this event, the detent mechanism 18 compresses slightly. However, when each such momentary forces ceases, the tension provided by spring 23 on detent mechanism 18 causes cleat 3 to return to its center position and once again fully engage pedal body 2. Thus, in summary, forces less than a predetermined magnitude do not cause the cleat and the pedal body to become disengaged. However, when forces that equal or exceed the predetermined magnitude are encountered, the cleat rotates a sufficient amount so that detent 18 clears the side of the cleat and permits the cleat to be fully disengaged from the pedal body under total control of the cyclist.

FIG. 17 discloses the state of shoe cleat 3 and pedal body 2 when the cyclist begins to engage the front of cleat 3 with pedal body 2. The process is initiated when the cyclist puts his foot on top of pedal body 2 in such a manner that the forward extension 14 of the pedal body is inserted into channel 9 in the front of cleat 3. Having done this, the cyclist then pushes down on the heel portion of his foot so as to push ridge 13 of the cleat against the inclined surface 19 of the detent mechanism 18. The pressure exerted by ridge 13 on the inclined surface 19 pushes detent mechanism 18 to the right on FIG. 17 and compresses spring 23 shown on FIG. 15. Element 18 moves further and further to the right as the pressure on surface 19 by ridge 13 increases.

As the pressure on detent mechanism 18 increases, it moves further and further to the right until its lower horizontal surface 20 clears the upper surface of ridge 13. At this time, detent mechanism 18 snaps to the left and enters channel 12 and its cavity in the rear portion of the cleat as shown on FIG. 18. The pedal 2 and cleat 3 are fully engaged at this time and the cyclist may exert pedaling force in any direction. An upward pedal force is easily accommodated by the pedal system of the present invention since the lower surface 20 of detent mechanism 18 bears against the bottom portion of channel 12 and against the upper portion of ridge 13. The rear portion of the cleat 3 cannot become disengaged from the pedal body 2 as upward force is generated since detent mechanism 18 cannot be compressed by such forces.

FIG. 19 shows the state of the pedal body 2 and cleat 3 after the cyclist rotates his foot to the point where detent mechanism 18 no longer engages the channel 12 and the rear portion of cleat 3. Prior to the initiation of this disengagement by the cyclist, the pedal body 2 and shoe cleat 3 are fully engaged so that the longitudinal axis a—a of the shoe cleat coincides with the longitudinal axis b—b of pedal body 2. At this time, the detent mechanism is fully extended within the rear cavity 12 of cleat 3. When the cyclist twists his foot to disengage it from pedal body 2, detent mechanism 18 is compressed as the shallower wall portions of channel 12 are encountered. As priorly mentioned, channel 12 and its cavity are deepest at its center and is increasingly shallow as the side of cleat 3 is approached. Thus, the further the cyclist twists his foot, the more detent mechanism 18 is depressed. Finally, as cleat 3 is rotated further, detent mechanism 18 approaches the side of the cleat and is fully compressed so that the outer tip of element 18 is in the same vertical plane as the rear extremity 22 of pedal body 2. When the cyclist twists his foot further, the detent mechanism 18 no longer bears against the surface of channel 12 and element 18 therefore clears the cleat and springs to the left as shown on FIG. 19. At this time, the cyclist may disengage the shoe cleat from the pedal body 2.

Modifications may be made to the disclosed pedal system to achieve results different from the above described operation. For example, on FIG. 11 the bottom surface of the detent mechanism 18 is shown to be flat and horizontal. With this design, the surface 20 bears against the inner portion of ridge 13 when pedal 2 and cleat 3 are fully engaged. At such times, it is impossible to separate the cleat and the pedal body by an upward force generated by the heel of the cyclist. However, under certain conditions it may be desired to have the cleat release from the pedal body when a certain predetermined vertical force is generated by cyclist. If this be the case, such results could be achieved merely by altering the design of detent mechanism 18 so that bottom surface 20 slopes upwardly instead of being horizontal. The degree of upward slope of surface 20 determines the vertical force required to release the cleat from the pedal body as an upward force is generated by the cyclist.

Figure 22:
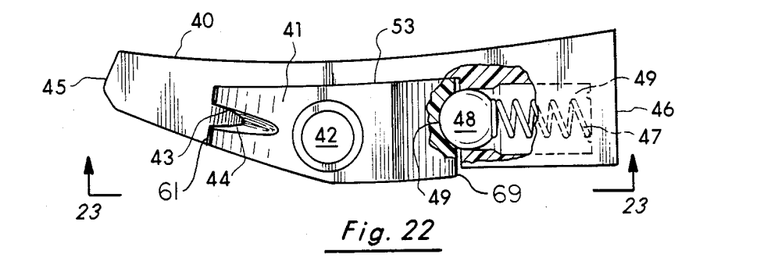
FIGS. 22 and 23 together disclose details of an alternative exemplary embodiment of the present invention.
Figure 23:
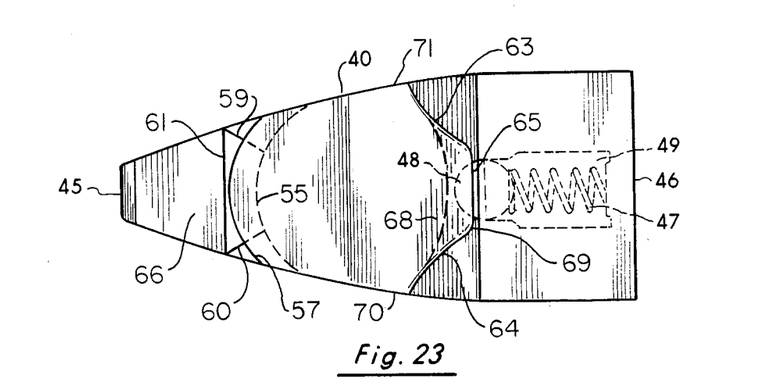

FIGS. 22 and 23, taken together, disclose an alternative embodiment of the invention. Shown on FIG. 22 is a shoe cleat 40 and a pedal body 41. The cleat has a front portion 45 and a rear portion 46 containing a spring 47 within a chamber 49. Also contained within the forward portion of chamber 49 is a ball 48 with the left end of spring 47 bearing against the right side of ball 48.

The pedal body 41 is mounted on shaft 42 and contains a channel or groove 44 in its front portion. The front portion of the shoe cleat 40 contains a rearwardly protruding ridge portion 43 which is adapted to coact with groove 44 in pedal body 41.

FIG. 23 is a bottom view of shoe cleat 40 which is attached by means of screws (not shown) to a cyclist's shoe in a manner similar to that of FIG. 16. As can be seen from FIG. 23, cleat 40 has a toe portion 66 having a transverse front extremity 45 and a rear facing arcuate segment 57. Reference number 57 also designates the forward arcuate extremity of pedal body 41. The rear facing extremity of outwardly projecting ridge 43 on the rear portion of toe 66 is shown by the dashed lines 55. The rear segment of the toe 66 is trapezoidal in configuration and is bounded by element 61 on its left side, element 59 on its top, element 60 on its bottom and element 55 on its right.

The rear portion of the pedal body is generally designated as 68 and has a rear extremity 69 which is transverse to the longitudinal axis of the pedal body. The sides of the pedal body in its rear portion are designated 70 and 71. The upper and lower rear portions of the pedal body are cut away so that the rear extremity 69 is connected to side 71 by segment 63 and to side 70 by segment 64. The cut away portions of the rear portion of the pedal body permit the cleat and the pedal body to be disengaged more easily in response to a twisting or torsional force on cleat 40. The longitudinal radii of the ridge 43 of the toe portion of the cleat 40 and channel 44 of the toe portion of body 41 also contribute to the ease of disengagement.

Shoe cleat 40 and pedal body 41 are matingly engaged with one another when the cyclist puts his shoe and attached shoe cleat 40 on top of the pedal body 41 and inserts ridge 43 in the front portion of shoe cleat 40 into groove 44 in the front portion of pedal body 41. Having done this, the cyclist pushes down on the rear portion of the shoe cleat 40 so that the top rear portion 53 of pedal body 41 engages the bottom of ball 48. Increasing pressure by the cyclist's foot at this time forces ball 48 to the right against spring 47. As ball 48 is further forced to the right, it enters the cavity 49 in the rear portion of pedal body 41. At this time, ball 48 snaps to the left so that pedal body 41 and shoe cleat 40 are fully engaged. The cyclist may generate pedaling forces in any direction at this time.

The shoe cleat 40 and pedal body 41 are disengaged from one another when the cyclist rotates his shoe and the attached shoe cleat with sufficient pressure to compress spring 47 and move ball 48 to the right a sufficient amount so that the cavity 49 and the rear portion of the pedal body 41 become disengaged from ball 48. The radii of the front of the cleat and the front of the pedal body permit these two elements to disengage.

Thus, in summary it can be seen that the pedal system of the invention permits the cyclist to achieve ideal pedaling efficiency with respect to all directions and force that the cyclist may generate. It may be further seen that the pedal system of the present invention permits the shoe cleat to be easily interlocked with the pedal body without the burden of adjusting straps and the like. It may be further seen that the pedal system of the present invention permits the cyclist to controllably release his foot from the pedal at any time without the burden of readjusting or releasing straps and the like.

While the preferred embodiment has been set forth with a degree of particularity, it is to be understood that changes and modifications could be made to the construction thereof which would still fall within the teachings of the claimed invention as set forth in the following claims.

I claim:

1. A bicycle pedal system comprising:
    a shoe cleat adapted to be affixed to a shoe of a cyclist,
    a front and a rear downwardly extending projection of said cleat,
    a pedal body adapted to be connected to a shaft on a bicycle crank arm,
    an arcuate forward extremity on said pedal body,
    an inner rear facing vertical surface on said front projection of said cleat,
    an arcuate channel in said rear facing vertical surface of said cleat,
    means for matingly engaging said arcuate channel of said inner rear facing vertical surface of said cleat with said arcuate forward extremity of said pedal body by inserting said arcuate forward extremity into said channel,
    an arcuate rear extremity of said pedal body,
    an arcuate rear facing vertical surface on said rear extremity of said pedal body,
    a spring loaded detent element projecting outwardly from said arcuate rear facing vertical surface of said body in a horizontal plane below the horizontal plane of a top surface of said pedal body,
    means including said detent element responsive solely to a downward movement of said rear projection of said cleat for matingly engaging said arcuate rear extremity of said pedal body with said rear projection of said cleat in an interlocked manner whereby pedaling forces may be applied to said pedal body by said cleat in an upward, downward, forward and backward direction with respect to the longitudinal axis of said bicycle, and
    means for controllably disengaging said cleat and said pedal body in response to a torsional force on said cleat in excess of a predetermined amount that is unrelated to the pedaling force that can be accommodated by said cleat and said body.

2. The pedal system of claim 1 wherein:
    a torsional force on said cleat less than said predetermined amount rotates said cleat from its normal interlocked position an amount less than that required to disengage said cleat from said body, and said cleat rotates and returns to a normal interlocked position collinear with said pedal body upon a termination of said torsional force less than said predetermined amount.

3. A bicycle pedal system comprising:
    a shoe cleat adapted to be affixed to a shoe of a cyclist,
    a pedal body adapted to be connected to a shaft on a bicycle crank arm,
    a substantially flat horizontally oriented top portion of said cleat,
    an arcuate rear facing vertical surface on a downwardly projecting front portion of said cleat affixed to said top portion of said cleat,
    an arcuate forward extremity of said pedal body,
    an arcuate channel in said rear facing vertical surface of said front portion of said cleat being adapted to matingly engage and receive said forward arcuate extremity of said pedal body,
    means including a downwardly projecting heel portion of said cleat and a heel portion of said pedal body engaged in said heel portion of said cleat, and said arcuate forward extremity and said arcuate channel on said rear facing vertical surface of said front portion of said cleat and a spring loaded detent element extending horizontally outward from an arcuate rear facing vertical surface of said heel portion of said body for matingly engaging said pedal body and said cleat in an interlocked manner whereby pedaling forces may be applied to said pedal body by said cleat in an upward, downward, forward and backward direction with respect to the longitudinal axis of said bicycle, and
    means for controllably disengaging said cleat from said pedal body in response to a torsional force in excess of a predetermined amount that is independent of the pedaling force that can be accommodated by said cleat and said body.

4. The pedal system of claim 3 wherein:
    a torsional force on said cleat less than said predetermined amount rotates said cleat from its normal interlocked position an amount less than that required to disengage said cleat from said body, and said cleat rotates and returns to its normal interlocked position collinear with said pedal body upon a termination of said torsional force less than said predetermined amount.

5. The system of claim 4 wherein said engaging means comprises:
    said downwardly projecting heel portion of said cleat affixed to said top portion of said cleat,
    an arcuate channel in a front facing vertical surface of said heel portion of said cleat,
    a lower ridge and an arcuate seating cavity above said ridge in said arcuate channel of said heel portion of said cleat,
    said arcuate rear facing vertical surface of said heel portion of said pedal body,
    said spring loaded detent element protruding horizontally outwardly from said arcuate rear facing vertical surface of said pedal body,
    a downwardly sloping surface on said detent element for compressing said detent element inwardly in response to a downward pressure exerted on said sloping surface by a bottom surface of said ridge subsequent to the mating engagement of said forward extremity of said body with said channel in said front portion of said cleat,
    said detent element being effective to release and protrude outwardly from said rear facing vertical surface of said body and to enter said arcuate seating cavity as said heel of said cleat travels downwardly so that said detent element no longer bears against said ridge.

6. The system of claim 5 wherein said means for controllably disengaging comprises:
   a first longitudinal radius on said front extremity of said body, and
   a longitudinal radius on said channel on said rear facing vertical surface of said cleat equal to said first radius.

7. The system of claim 6 wherein said means for controllably disengaging further comprises:
   a longitudinal radius on said rear facing vertical surface of said heel portion of said pedal body equal to said first mentioned radius, and
   a longitudinal radius on said channel in said heel of said cleat equal to said first mentioned radius.

8. A bicycle pedal system comprising:
   a shoe cleat adapted to be affixed to a shoe of a cyclist,
   a pedal body adapted to be connected to a shaft on a bicycle crank arm,
   a forward extension of said pedal body having a first longitudinal radius on its front extremity,
   a substantially flat horizontally oriented top portion of said cleat,
   a downwardly projecting front portion of said cleat affixed to said top portion,
   an arcuate channel on a rear facing vertical surface of said front portion of said cleat with said channel having a longitudinal radius equal to said first longitudinal radius, said channel further having a vertical radius,
   a downwardly projecting rear heel portion of said cleat affixed to said top portion and having an inner front facing vertical surface,
   an inner arcuate channel on said front facing vertical surface of said heel portion of said cleat with said last named channel having a longitudinal radius equal to said first longitudinal radius,
   a lower front surface of said heel portion of said cleat,
   a ridge on said lower front surface of said heel portion,
   an arcuate seating cavity in said channel of said heel portion with said cavity being deepest in the middle of said heel portion intermediate the sides of said heel portion and having a decreasing depth as each side of said heel portion is approached,
   said front extremity of said body being adapted to be inserted into and matingly engaged with said channel in said front portion of said cleat so that said front extremity engages in said front portion of said cleat,
   an arcuate rear extremity of said pedal body having a longitudinal radius equal to said first longitudinal radius,
   a spring loaded detent element normally protruding outward from a rear facing vertical surface of said rear extremity of said pedal body,
   a lip on said ridge for compressing said detent element inwardly after said forward extension of said body is matingly engaged with said channel in said front portion of said cleat and as said lip of said ridge in said heel portion of said cleat presses downward against said detent element,
   said detent element being adapted to clear said ridge and extend outwardly from said rear facing vertical surface of pedal body and enter said arcuate cavity in response to a further downward travel of the heel portion of said cleat with respect to said rear extremity of said pedal body, and
   said pedal body and said cleat being matingly engaged upon the outward extension of said detent element as it clears said ridge and enters said cavity,
   said rear facing surface of said body engaging in said channel in said heel portion when said body and said cleat are matingly engaged,
   said radii being effective to effect a disengagement of said cleat and said body in response to a torsional force on said cleat in excess of a predetermined amount with said torsional 9. A pedal system comprising:
   a solid pedal body,
   a pedal axle extending perpendicular to and through said pedal body,
   a shoe cleat,
   a front downward extension on said cleat,
   a rear facing vertical surface having an arcuate channel on said front extension of said cleat,
   an arcuate forward facing vertical surface on a front extremity of said body,
   means for matingly engaging said front extremity of said body with said channel of said cleat in an interlocked manner by inserting said front extremity into said channel,
   an arcuate rear facing vertical surface on a rear extremity of said body, a detent horizontally oriented perpendicular to said axle and extending outwardly from said rear facing vertical surface of said pedal body,
   a downwardly projecting rear extremity of said cleat having a front facing arcuate vertical surface,
   an arcuate channel in said front facing surface of said cleat,
   a cavity in said last mentioned channel,
   means including said detent for matingly engaging said rear extremity of said cleat and said rear extremity of said body by pressing a lower portion of said rear extremity of said cleat against a downwardly inclined upper surface of said detent to depress said detent inwardly until it clears said lower portion of said cleat and moves outwardly into said cavity in said last mentioned channel,
   said arcuate surfaces of said cleat and said arcuate extremities of said body having horizontal equal radii which allow said cleat to be rotated horizontally to release said cleat and said body in response to a torsional force in a circular manner along the outside dimensions of said pedal body when a predetermined release force is exceeded.

* * * * *

UNITED STATES PATENT AND TRADEMARK OFFICE
CERTIFICATE OF CORRECTION

PATENT NO. : 4,815,333
DATED : March 28, 1989
INVENTOR(S) : Eric A. Sampson

It is certified that error appears in the above-identified patent and that said Letters Patent is hereby corrected as shown below:

In claim 8, column 14, line 21, after "said torsional" the following should be inserted -- force being independent of any pedaling forces that can be accommodated by said interlocked cleat and said pedal body.--.

Signed and Sealed this

Twenty-seventh Day of March, 1990

Attest:

JEFFREY M. SAMUELS

*Attesting Officer*  *Acting Commissioner of Patents and Trademarks*